United States Patent
Zarek

[19]

[11] Patent Number: 6,147,673
[45] Date of Patent: *Nov. 14, 2000

[54] COMPUTER INPUT DEVICE AND KEYBOARD

[75] Inventor: Lynne Zarek, Boise, Id.

[73] Assignee: Micron Electronics, Inc., Nampa, Id.

[ * ] Notice: This patent issued on a continued prosecution application filed under 37 CFR 1.53(d), and is subject to the twenty year patent term provisions of 35 U.S.C. 154(a)(2).

[21] Appl. No.: 09/044,387

[22] Filed: Mar. 18, 1998

[51] Int. Cl.[7] .............................. G09G 5/00; A63F 9/24
[52] U.S. Cl. .............................................. 345/156; 463/37
[58] Field of Search .................................... 345/168, 169, 345/163; 400/489; 463/37, 38; 341/22, 21

[56] References Cited

U.S. PATENT DOCUMENTS

| | | |
|---|---|---|
| D. 356,558 | 3/1995 | Montgomery et al. ............... 411/364 |
| 2,783,109 | 2/1957 | Frey . |
| 3,859,930 | 1/1975 | Sherwin . |
| 4,052,944 | 10/1977 | Jennings . |
| 4,765,583 | 8/1988 | Tenner ............................... 248/444 |
| 4,852,498 | 8/1989 | Judd ..................................... 108/43 |
| 5,021,771 | 6/1991 | Lachman . |
| 5,029,260 | 7/1991 | Rollason . |
| 5,049,863 | 9/1991 | Oka ..................................... 345/163 |
| 5,054,736 | 10/1991 | Champoux . |
| 5,073,050 | 12/1991 | Andrews . |
| 5,081,936 | 1/1992 | Drieling . |
| 5,187,644 | 2/1993 | Crisan ................................. 361/393 |
| 5,263,423 | 11/1993 | Anderson . |
| 5,281,958 | 1/1994 | Ashmun et al. .................... 345/157 |
| 5,355,811 | 10/1994 | Brewer . |
| 5,397,189 | 3/1995 | Minogue . |
| 5,416,498 | 5/1995 | Grant . |
| 5,416,730 | 5/1995 | Lookofsky . |
| 5,423,227 | 6/1995 | Polaert et al. ................. 73/862.044 |
| 5,428,355 | 6/1995 | Jondrow et al. . |
| 5,466,078 | 11/1995 | Szmanda et al. . |
| 5,502,460 | 3/1996 | Bowen .................................. 345/168 |
| 5,504,500 | 4/1996 | Garthwaite et al. ................. 345/157 |
| 5,519,569 | 5/1996 | Sellers .................................. 361/680 |
| 5,527,116 | 6/1996 | Huellemeier et al. ................ 400/82 |
| 5,541,593 | 7/1996 | Arsem . |
| 5,564,844 | 10/1996 | Patterson, Jr. et al. . |
| 5,583,744 | 12/1996 | Oguchi et al. . |
| 5,644,338 | 7/1997 | Bowen .................................. 345/168 |
| 5,645,277 | 7/1997 | Cheng .............................. 273/148 B |
| 5,648,772 | 7/1997 | Friedrich et al. . |

(List continued on next page.)

FOREIGN PATENT DOCUMENTS

| | | |
|---|---|---|
| 674693 | 8/1990 | Switzerland . |
| 2244546 | 12/1991 | United Kingdom . |

OTHER PUBLICATIONS

RCA Remote Model No. RTB100, Top Isometric View.
RCA Remote Model No. RTB100, Bottom Isometric View.
Sony Playstation, Top Isometric View.
Sejin Electron Inc., SWK–5697WT, Bottom Isometric View.
Sejin Electron inc., SWK–5697WT, Top Isometric View.

Primary Examiner—Mark R. Powell
Assistant Examiner—Thu Nguyen
Attorney, Agent, or Firm—Perkins Coie LLP

[57] ABSTRACT

An input device and keyboard for a computer. The input device includes controls that receive commands from a user and transmit the commands to the computer via a communication link. In one embodiment, the controls include an input button which is elongated and contoured to engage a relatively large portion of the user's finger. The input button may also be curved and/or canted so as to support the user's finger in an ergonomic position. In another embodiment, the input device may be housed within an opening in the keyboard and may be detached from the keyboard by removing it from the opening. The input device may be operated when either attached to or detached from the keyboard. In still another embodiment, right and left input devices are removably attached to the keyboard and may be operated with the user's right and left hands, respectively.

66 Claims, 5 Drawing Sheets

U.S. PATENT DOCUMENTS

| | | |
|---|---|---|
| 5,659,307 | 8/1997 | Karidis et al. . |
| 5,662,422 | 9/1997 | Fort . |
| 5,692,815 | 12/1997 | Murphy . |
| 5,726,683 | 3/1998 | Goldstein et al. ................... 345/163 |
| 5,732,910 | 3/1998 | Martin . |
| 5,743,666 | 4/1998 | VanZeeland et al. . |
| 5,818,690 | 10/1998 | Spencer . |
| 5,825,612 | 10/1998 | Aubuchon et al. ................... 361/680 |
| 5,862,933 | 1/1999 | Neville . |
| 5,871,094 | 2/1999 | Leibowitz . |
| 5,886,686 | 3/1999 | Chen ................................. 345/168 |
| 5,893,540 | 4/1999 | Scott . |
| 5,957,595 | 9/1999 | Chen . |

COMPUTER INPUT DEVICE AND KEYBOARD

TECHNICAL FIELD

The present invention is directed toward an input device and keyboard for a computer.

BACKGROUND OF THE INVENTION

Personal computers are relatively small computers that may be operated from a desktop or other flat work surface. Conventional personal computers typically include a display on the desktop and a processor coupled to the display. A first input device, such as a keyboard, is coupled to the processor to allow a user to transmit alphanumeric commands to the processor. Conventional computers also generally include at least one second input device, such as a mouse, that has a pointing device and one or more input buttons. The pointing device of the second input device may include a roller ball, touch pad, joystick, or similar device used to manipulate or move images on the display. The input buttons of the second input device may be activated by the user to transmit additional commands to the processor.

One drawback with a typical second input device is that it may be awkward to use the input buttons. In many conventional second input devices, the input buttons are difficult to operate because they are pads on an upper surface that must be pressed downwardly normal to a desktop or keyboard surface. For example, to adequately engage and quickly press the input buttons, users must generally utilize the muscles and tendons associated with the metacarpal bones of their hands while their first and second fingers are almost fully extended. Activating the input buttons with fully extended fingers may cause the users to suffer strain and/or repetitive stress disorders. If the users attempt to curl their fingers in a more natural position, only their fingertips may engage the input buttons, so that the rest of their fingers are unsupported. As a result, some people may experience fatigue while operating a mouse or other conventional second input devices. Furthermore, when the input buttons are adjacent to each other, an incorrect input button may be depressed inadvertently causing an erroneous signal to be transmitted to the processor.

Another drawback with conventional second input devices is that they are generally tailored to be used by either right-handed or left-handed users. As such, if the user needs to operate the second input device with either hand, or if the same computer is operated by both left-handed and right-handed users, separate left-hand and right-hand second input devices may need to be repeatedly interchanged with one another.

Still a further drawback with conventional second input devices is that they are generally either a permanent, integral component of the keyboard or a permanent, separate component that may not be attached to the keyboard. Conventional second input devices are thus inconvenient to users who, on some occasions, wish to operate a second input device when it is attached to the keyboard, and on other occasions wish to operate the second input device when it is detached from the keyboard.

SUMMARY OF THE INVENTION

The present invention is directed toward input devices and keyboards for computers. In one embodiment, the input device has a housing with an upper surface and a lower surface opposite the upper surface. An elongated input button is positioned proximate to the housing and is accessible to generate input commands that are transmitted to the computer. The elongated input button may be shaped to engage a relatively large portion of the user's finger. For example, the input button may be curved so that users engage both the distal and middle phalanges of their fingers with the input button when their fingers are draped over the input button in an ergonomic position. The input button may also be concave to engage both a lower surface and a side surface of the users' fingers. In a further embodiment, the input button may also be canted so that the users may rotate their wrists to a comfortable position when engaging the input button.

In one particular embodiment, the keyboard may include two second input devices, one toward each end of the keyboard. Each second input device may be removably attachable to the keyboard to be operated when either attached to or detached from the keyboard. The keyboard, for example, may have first and second openings or bays configured to hold the second input devices. Additionally, each bay may have a securing device to prevent the corresponding second input device from being inadvertently detached from the keyboard.

DETAILED DESCRIPTION OF THE INVENTION

The present invention is directed toward input devices and keyboards for personal computers. In one embodiment, an input device may be attached to or detached from the keyboard, and the input device may have input buttons configured to engage a user's fingers in an ergonomic position. Many specific details of certain embodiments of the invention are set forth in the following description and in FIGS. 1–7 to provide a thorough understanding of such embodiments. One skilled in the art, however, will understand that the present invention may have additional embodiments that may be practiced without several of the details described in the following description.

Figure 1:
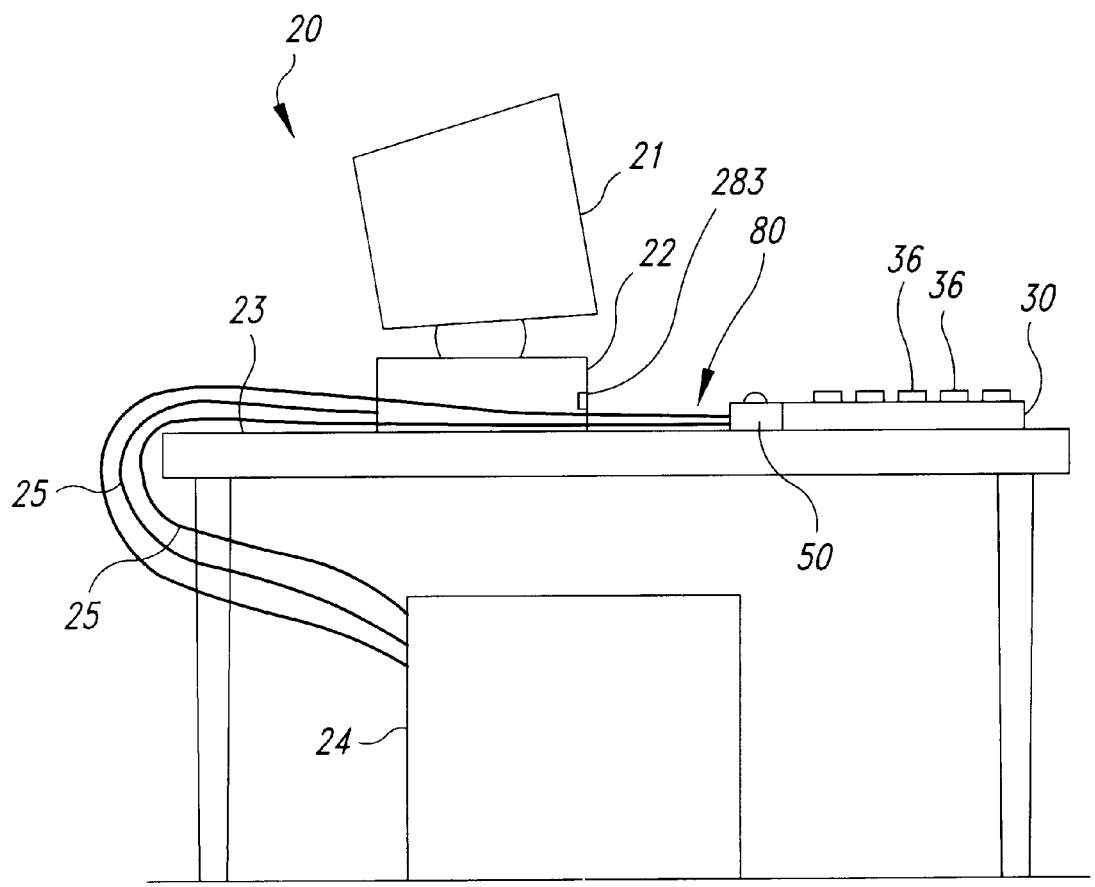
FIG. 1 is a side view of a computer having a keyboard and two input devices in accordance with an embodiment of the invention.

FIG. 1 is a side view of a computer 20 having a display 21 coupled to a base 22. The base 22 is positioned on a flat work surface 23, such as a desktop, and is coupled to a processor 24 by a cable 25. A first input device, such as a keyboard 30, is positioned on the work surface 23 adjacent the base 22, and the first input device is also coupled to the processor 24 by another cable 25. The keyboard 30 includes a plurality of input keys 36 and a pair of second input devices 50 (only one shown in FIG. 1). The second input devices 50 are each coupled to the processor 24 by a communication link 80. A user (not shown) transmits signals to the processor 24 via the communication link 80 and the cables 25 by manipulating the second input devices 50 and the input keys 36.

Figure 2:
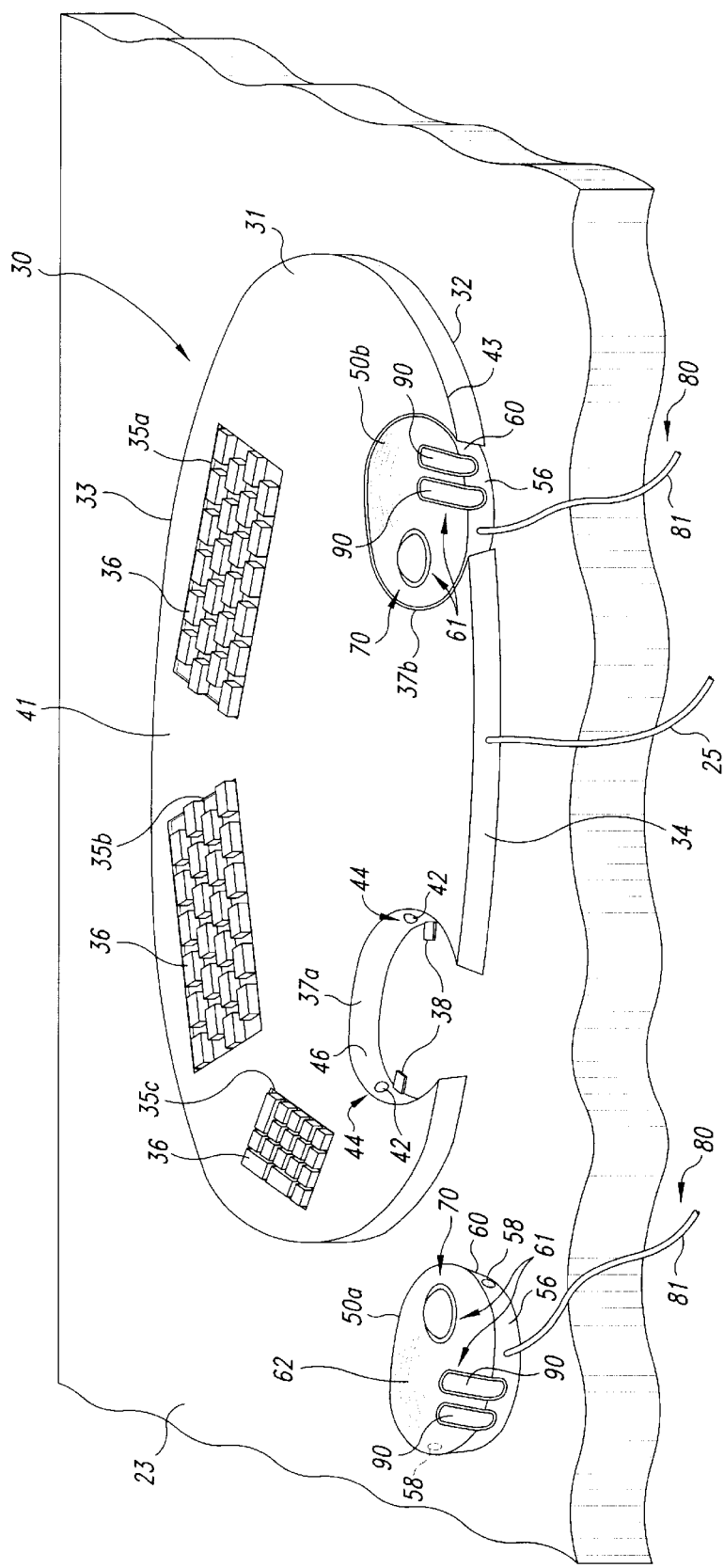
FIG. 2 is a top rear isometric view of the keyboard shown in FIG. 1.

FIG. 2 is a top rear isometric view of an embodiment of the keyboard 30 in accordance with the invention. The keyboard 30 includes a keyboard housing 41 having an upwardly facing top surface 31 and a downwardly facing bottom surface 32 opposite the top surface. A forward surface 33 facing toward the user and a rear surface 34 facing away from the user both extend between the top and bottom surfaces 31 and 32.

The top surface 31 may have a curved outer edge 43, and in one embodiment, both the top surface 31 and bottom surface 32 have a generally oval shape to orient the input keys 36 and the second input devices 50 in ergonomic positions. In other embodiments, the top and bottom surfaces 31 and 32 may have other shapes that similarly orient the input keys 36 and the second input devices 50 in positions that are comfortable for the user.

The top surface 31 includes a plurality of input key apertures 35 (shown by reference numbers 35a, 35b and 35c) from which the input keys 36 project. In the embodiment shown in FIG. 2, the input key apertures 35a and 35b may each accommodate approximately half a standard QWERTY input key configuration and may be canted toward each other to orient the user's hands in an ergonomic position. The input key aperture 35c may be shaped to accommodate additional input keys 36, such as number keys, function keys or other types of input keys.

The top surface 31 further includes two device openings or bays 37 (shown by reference numbers 37a and 37b) positioned toward opposite ends of the keyboard 30. Each opening 37 is configured to removably receive one of the second input devices 50 (indicated by reference numbers 50a and 50b). Accordingly, the top surface 31 may include a right opening 37a to receive one second input device 50a and a left opening 37b to receive the other second input device 50b. Each of the second input devices 50 may be moved into and out of an opening 37 between an attached position and a detached position. For purposes of illustration, the second input device 50a is shown in the detached position, and the second input device 50b is shown in the attached position. As will be discussed in greater detail below, the second input devices 50 may be operated by the user when in either the attached or the detached positions.

Figure 3:
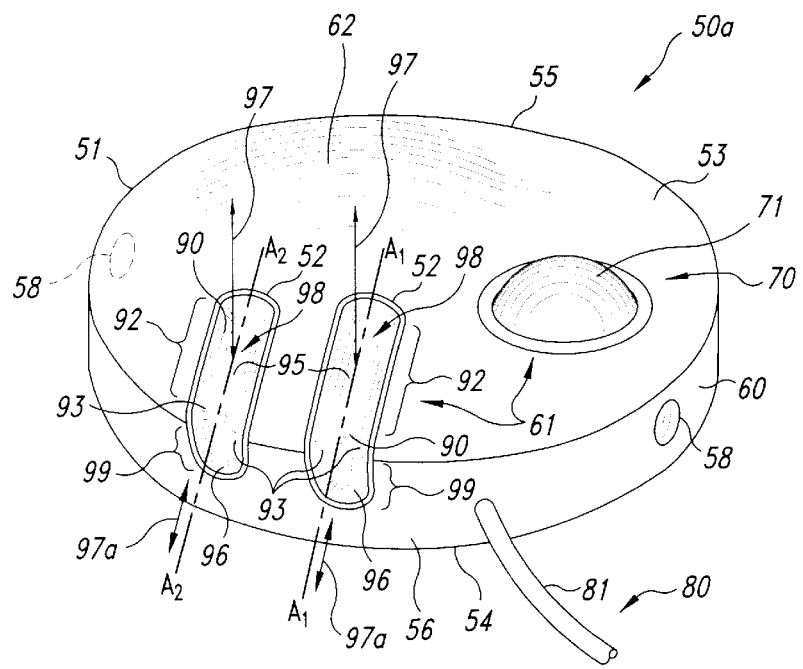
FIG. 3 is a detailed top isometric view of one of the input devices shown in FIG. 2.

FIG. 3 is a detailed top isometric view of the second input device 50a shown in FIG. 2. The components and features of one second input device 50a may be similar to those of the other second input device 50b, and thus, unless otherwise noted, the description and reference numbers of the second input device 50a apply generally to the second input device 50b. Referring to FIGS. 2 and 3, the second input device 50a has a device housing 51 (FIG. 3) with an upper surface 53 (FIG. 3), a lower surface 54 (FIG. 3), and an outer surface 60 extending between the upper and lower surfaces 53 and 54. The outer surface 60 has a front portion 55 (FIG. 3) facing toward the user and a rear portion 56 facing away from the user when the user operates the second input device 50a. The upper surface 53 may include a convex region 62 between the front and rear portions 55 and 56 to support the palm of a user's hand. A plurality of controls 61 may be positioned at least partially rearward of the convex region 62 at the rear portion 56 of the housing 51. Signals generated by the controls 61 are transmitted to the processor 24 (FIG. 1) via the communication link 80, which may include a cable 81 extending from the rear portion 56.

The controls 61 may include a pointing device 70 to move images on the display 21 (FIG. 1) and two input buttons 90 to transmit command signals to the processor 24 (FIG. 1). As shown in FIG. 3, the pointing device 70 may include a roller ball 71 projecting upwardly from the upper surface 53. The roller ball 71 may be rotated relative to the housing 51 to move a pointing icon across the display 21. As discussed below with reference to FIGS. 6 and 7, other pointing devices may be used in the second input devices 50 in other embodiments.

Still referring to FIG. 3, the input buttons 90 may be positioned within the device housing 51 in two button apertures 52. The button apertures 52 and the input buttons 90 may have an elongated dimension extending along finger axes $A_1$—$A_1$ and $A_2$—$A_2$. Additionally, each input button 90 may have a top surface 98 extending along one of the finger axes $A_1$—$A_1$ or $A_2$—$A_2$ to engage and support a substantial portion of a user's finger in operation. The top surface 98 of each input button 90, more specifically, may have a proximal section 92 extending along one of the finger axes and a distal section 99 curving downwardly from the corresponding finger axis toward the lower surface 54 of the housing 51. The proximal section 92 may have a length between approximately 1.25" and approximately 5.0", and the distal section 99 may have a length between approximately 0.5" and 2.0". The curve between the proximal section 92 and the distal section 99 may be proximate to the back portion 56 of the housing 51. The top surface 98 of each button 90 is accordingly shaped to conform to a finger of the user when the distal phalange of the finger (i.e., the portion of the finger located between the last knuckle and the finger tip) is bent or curled slightly downwardly. As a result, the user's fingers may bend over the input buttons 90 in an ergonomic position such that the distal phalanges are engaged by the distal section 99 and the intermediate and/or the proximal phalanges (located progressively closer to the user's hand) are engaged by the proximal section 92. To accommodate the curvature of the input buttons 90, the button apertures 52 may extend through both the upper surface 53 and the back portion 56 of the housing 51. Additionally, the distal sections 99 of the input buttons 90 are accessible through the opening 37 in the keyboard housing 31 (FIG. 2) when the second input device 50 is attached to the keyboard 30 (FIG. 2).

The top surface 98 of the input buttons 90 may also be contoured to engage more surface area of the user's finger. In the embodiment shown in FIG. 3, the top surface 98 is generally concave relative to the upper surface 53 and the back portion 56 of the housing 51. Additionally, each top surface 98 may also have a rounded lower portion 95 to support the lower surface of the user's finger, and each top surface 98 may have side portions 93 to engage the side surfaces of the user's finger. The overall width of the top surface 98 may be between approximately 0.375" and approximately 1.5". The edges of the side portions 93 may be flush with the upper surface 53 of the housing 51 (shown in FIG. 3), or they may project slightly above or below the upper surface 53. Additionally, an end portion 96 of each distal section 99 may be rounded.

In the embodiment shown in FIG. 3, the input buttons 90 are movable relative to the device housing 51 along a motion path indicated by arrow 97 between a raised position (shown in FIG. 3) and a depressed position (not shown). To activate the input buttons 90, the user vertically depresses the input buttons 90 in a conventional manner by pivoting the proximal and/or intermediate phalange of the user's finger relative to the user's hand. In another embodiment, also shown in FIG. 3, the input buttons 90 are movable horizontally as indicated by arrow 97a between an extended position (shown in FIG. 3) and a retracted position (not shown) by pivoting the distal and/or the intermediate phalanges of the user's fingers. In either case, users may rest their index fingers on one of the input buttons 90 and one of their middle fingers on the other input button to selectively activate either button. Of course, the input buttons 90 may be activated with other digits as well.

As shown in FIG. 2, the controls 61 of the second input device 50a are arranged so that right-handed users may engage one input button 90 with their index finger, the other input button 90 with one of their middle fingers, and the pointing device 70 with their thumb. The arrangement of the input buttons 90 and the pointing device 70 of the second input device 50b generally mirror the arrangement of the second input device 50a, except that the controls 61 of the second input device 50b are operated by the left hand of a user.

As discussed above, the second input devices 50 may be attached to or detached from the keyboard 30 to be operated in either position. To detach the second input device 50 from the keyboard 30, the second input device 50 may be pulled upward and out of the opening 37 (FIG. 2). To attach the second input device 50 to the keyboard 30, the second input device 50 may be inserted downward into the opening 37. In another embodiment (not shown) in which the rear surface 34 of the keyboard 30 does not extend partially around the back portion 56 of the second input device 50, the second input device 50 may be slid horizontally into the device opening 37. When the second input device 50 is attached to the keyboard 30, the outer surface 60 of second input device 50 may be flush with the curved outer edge 43 of the keyboard 30 to define a smooth contour along the backside of the keyboard 30.

The second input devices 50 may also be prevented from passing through the bottom surface 32 of the keyboard 30. Referring to FIG. 2, for example, a plurality of tabs 38 may project inwardly into each device opening 37 from the bottom surface 32 of the keyboard 30 to prevent the corresponding second input devices 50 from passing entirely through the device opening 37. Alternatively, the outer surface 60 of the second input device 50 and an inner surface 46 of the opening 37 may be tapered inwardly so that the second input device 50 wedges against the inner surface 46 when it is attached to the keyboard 30.

The second input device 50 may also be releasably secured to the keyboard 30 with latching device 44. In one embodiment, the latching device 44 includes a pair of first engagement members 42 that may be aligned with corresponding second engagement members 58 in the outer surface 60 of the second input device 50. The first engagement members 42 may be spring-loaded balls biased inwardly toward the center of the device opening 37, and the second engagement members 58 may be sockets in the second input device 50 that receive the balls 42 when the second input device is placed within the opening 37. In other embodiments, the latching device 44 may have a tab (not shown) that snaps into a detent (not shown) or other mechanisms that releasably secure the second input devices 50 to the keyboard 30.

The second input devices 50 and the keyboard 30 shown in FIGS. 1–3 may be more comfortable and less fatiguing to use than conventional input devices and keyboards. For example, because the input buttons 90 have an elongated proximal section 92 and a distal section 99 curved downward from the proximal section 92, each input button supports a substantial portion of a user's finger even when the finger is flexed at the knuckles in an ergonomic position. Accordingly, users may bend their fingers over the input buttons 90 in a relaxed position, potentially reducing the likelihood for fatigue and/or repetitive stress disorders.

The second input devices 50 and the keyboard 30 may also be easier to use compared to conventional devices because the input buttons 90 may have concave top surfaces 98 to engage both the lower and side surfaces of the user's fingers. The concave shape of the top surfaces may potentially reduce the likelihood of inadvertently depressing the incorrect input button because they make it easier to feel the location of the buttons. As such, the second input devices 50 may be easier to use.

The second input device 50 and the keyboard 30 shown in FIGS. 1–3 also enhance the convenience and flexibility to operating the computer. Referring to FIG. 2, the keyboard 30 includes two second input devices 50a and 50b that are configured to be engaged by the user's right hand and left hand, respectively. Accordingly, users may operate either the right input device 50a or the left input device 50b, depending on their preference. Furthermore, unlike conventional keyboards and input devices, multiple users with different preferences may operate the same keyboard 30 without having to replace one input device with another that more closely accommodates an individual user's dexterity.

The second input device 50 and the keyboard 30 shown in FIGS. 1–3 may also enhance the versatility and convenience of the computer 20 because the second input devices 50 are accessible to the user in either the detached or attached positions. For example, in particularly cramped or confined situations, the second input device 50 may be operated in the attached position. Conversely, in less confined environments, the user may detach the second input device 50 and operate it apart from the keyboard 30.

Figure 4:
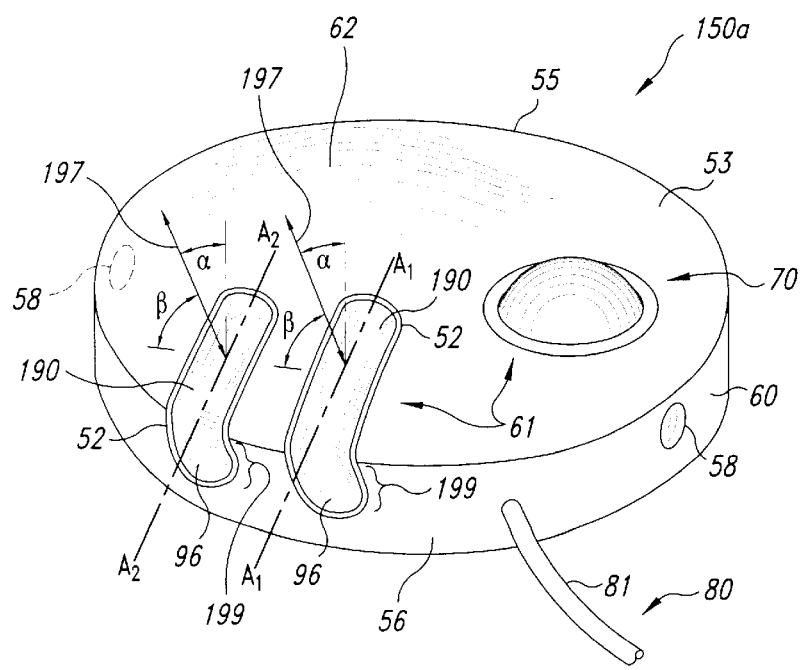
FIG. 4 is a top isometric view of an input device having input buttons in accordance with another embodiment of the invention.

FIG. 4 is a top isometric view of another second input device 150a having input buttons 190 in accordance with another embodiment of the invention. As shown in FIG. 4, each input button 190 is canted about a corresponding finger axis $A_1$—$A_1$ or $A_2$—$A_2$ from the vertical, as indicated by angle $\alpha$, so that a distal section 199 of each input button 190 is inclined toward the pointing device 70. The button apertures 52 are shaped to accommodate the canted input buttons 190. The motion path 197 along which each input button 190 travels as it is activated is also canted so as to form an acute angle $\beta$ with the housing upper surface 53. An advantage of the canted input buttons 190 shown in FIG. 4 is that users may rotate their wrists slightly outward when operating the input buttons 190. This orientation may be more comfortable and produce less strain in the tendons of the user's hands and fingers.

Figure 5:
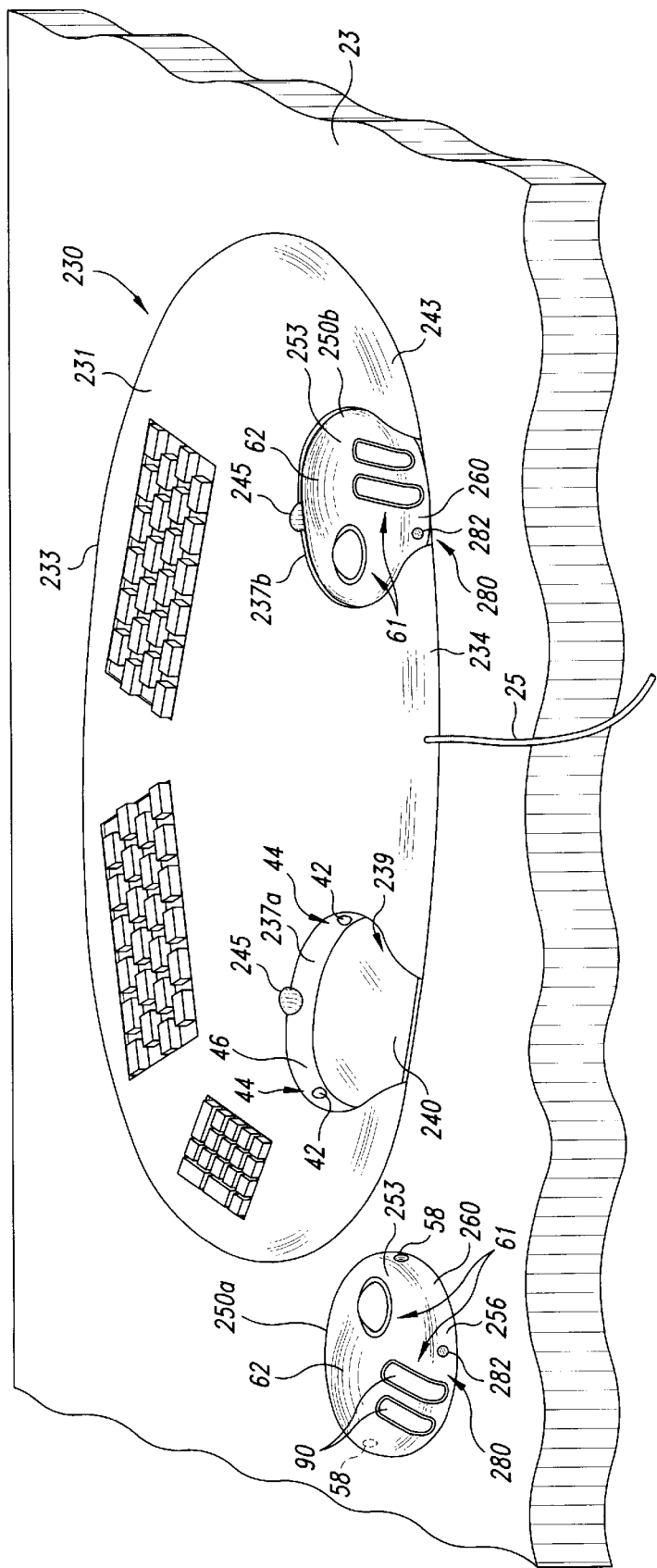
FIG. 5 is a top rear isometric view of a keyboard and input devices in accordance with still another embodiment of the invention.

FIG. 5 is a top isometric view of another keyboard 230 with two second input devices 250 (shown by reference numbers 250a and 250b) having rounded outer surfaces 260 and smoothly contoured upper surfaces 253 in accordance with another embodiment of the invention. Accordingly, a top surface 231 of the keyboard 230 may be smoothly contoured with both the rear surface 234 and the forward surface 233 to form a rounded outer edge 243. Two openings 237 (shown by reference numbers 237a and 237b) in the keyboard 230 are open to both the top surface 231 and the rear surface 234 to receive the second input devices 250. The outer surfaces 260 and the top surfaces 253 of the input devices 250 may be generally flush with the outer edge 243 and the top surface 231 of the keyboard 230 when the input devices 250 are positioned in the device openings 237.

As shown in FIG. 5, each opening 237 has an open end 239 in the top surface 231 and a closed end 240 in the bottom surface 232. Accordingly, the second input device 250 rests on the closed end 240 in the attached position so as not to pass completely through the device opening 237. As discussed above with reference to FIGS. 2 and 3, each second input device 250 may include a pair of sockets 58 to receive spring-loaded balls 42 positioned in the inner surface 46 of the device opening 237 to secure the second input device 250 to the keyboard 230. The top surface 231 of the keyboard 230 may include a finger slot 245 at each opening 237 to more easily detach the second input devices 250 from the keyboard 230.

Each second input device 250 may be operatively coupled to the computer 20 (FIG. 1) by a wireless communication link 280 having a transmitter 282 in the second input device 250 and a receiver 283 in the base 22 (FIG. 1). The controls 61 send command signals to the transmitter 282, which broadcasts the signals at a selected frequency to the receiver 283. In one embodiment, the transmitter 282 and receiver 283 operate with infrared signals, and in another embodiment the transmitter 282 and receiver 283 operate at radio frequencies. As shown in FIG. 5, the transmitter 282 may be positioned in the back portion 256 of the second input device 250 to be aligned with the receiver 283 when the second input device 250 is either attached to or detached from the keyboard 230.

The curved second input device 250 and the curved keyboard 230 shown in FIG. 5 may be more comfortably gripped than a conventional square edged keyboard and input device. Additionally, the wireless communication link 280 allows the second input device 250 to be moved to a variety of positions to allow more convenient operation of the second input device 250.

Still another advantage of the keyboard 230 is that the closed end 240 of the opening 237 may more completely support the second input device 250 when the second input device is in the attached position. The closed end 240 may also prevent the second input device from being inadvertently bumped upwardly out of the opening 237 from below. Conversely, an advantage of the device opening 37 shown in FIG. 2 is that it may allow the input device to be more easily removed from the opening because the device opening 37 is open to the bottom surface 32 of the keyboard.

Figure 6:
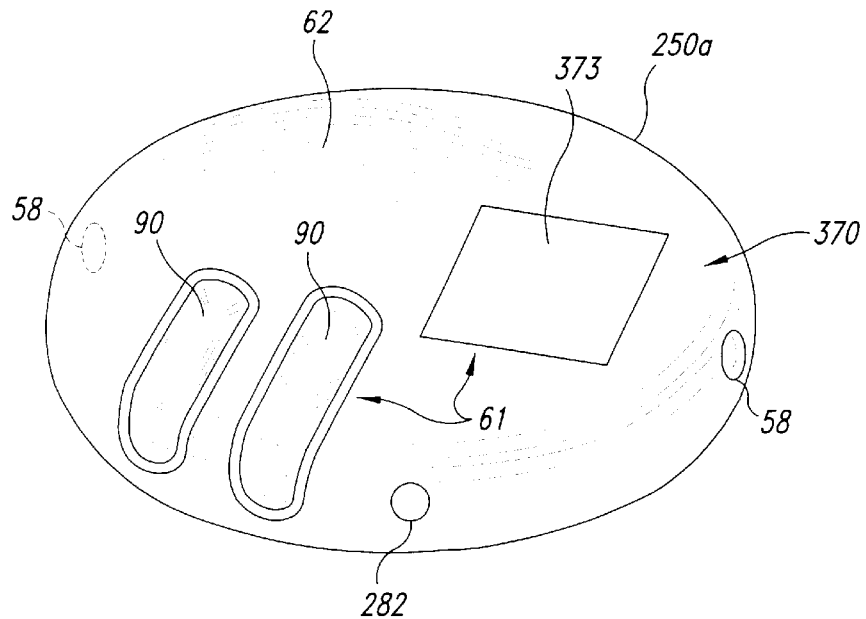
FIG. 6 is a top isometric view of an input device having a pointing device in accordance with yet another embodiment of the invention.
Figure 7:
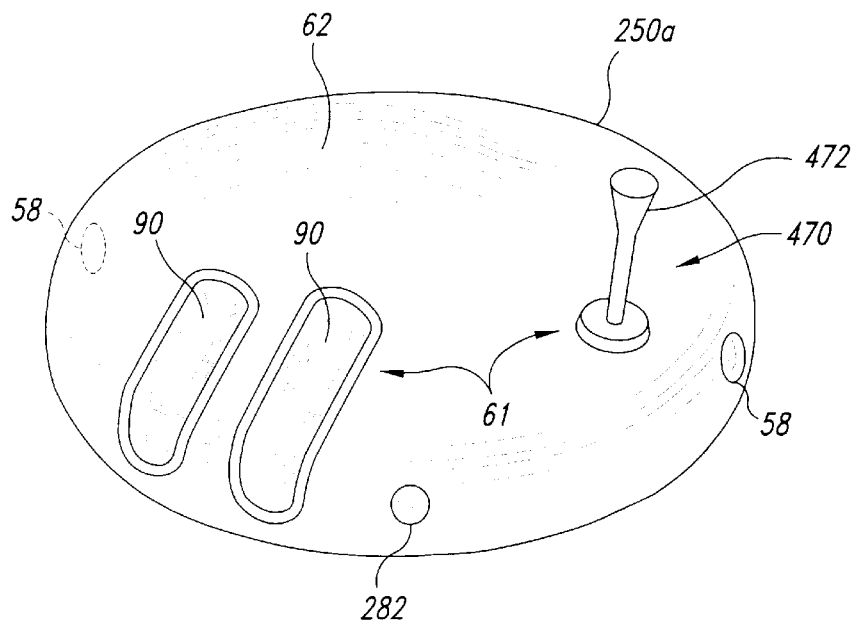
FIG. 7 is a top isometric view of an input device having a pointing device in accordance with yet another embodiment of the invention.

In addition to the pointing device 70 shown in FIGS. 1–5, the second input device may include several other pointing mechanisms. As shown in FIG. 6, for example, the pointing device 370 may be a touch-sensitive pad 373 to move images on the display 21 (FIG. 1) corresponding to the motion of the user's fingers on the surface of the touch pad 373. In another embodiment, shown in FIG. 7, the pointing device 470 may be a joystick 472 that pivots with respect to the housing 51. An advantage of the touch pad 373 and joystick 472 is that either one may be preferred by certain users over the roller ball 71 shown in FIGS. 1–5.

From the foregoing it will be appreciated that, although specific embodiments of the invention have been described herein for purposes of illustration, various modifications may be made without deviating from the spirit and scope of the invention. For example, the second input devices shown in the figures may include more than two input buttons and/or more than one pointing device. Accordingly, the invention is not limited except as by the appended claims.

What is claimed is:

1. An input assembly for a computer having a display, comprising:

a first input device having a first input device housing, a first end, a second end opposite the first end, and a plurality of input keys between the first and second ends; and at least two second input devices;

wherein one second input device is removably attached to the first input device toward the first end thereof and movable relative to the first input device between an attached position in which the one second input device is attached to the first input device and a detached position in which the one second input device is spaced apart from the first input device, the one second input device having a first input button to transmit a first signal to the computer, a first pointing device to move an image on the display of the computer, and a first wireless signal transmitter operatively coupleable to the computer to transmit the first signal; and further wherein the other second input device is removably attached to the first input device separately from the one second input device toward the second end of the first input device and is movable relative to the first input device between an attached position in which the other second input device is attached to the first input device and a detached position in which the other second input device is spaced apart from the first input device, the other second input device having a second input button to transmit a second signal to the computer and a second pointing device to move the image on the computer display, and a second wireless signal transmitter operatively coupleable to the computer to transmit the second signal; and wherein at least one of the two second input devices includes a second input device housing having an upper surface and a lower surface opposite the upper surface and an elongated input button proximate to the second input device housing and movable relative to the second input device housing, the input button having an elongated engaging surface to receive distal and middle phalanges of a human finger, the engaging surface being concave in a first plane relative to the upper surface of the second input device housing to engage lower and side surfaces of the finger, the engaging surface being convex in a second plane transverse to the first plane to engage the finger when the finger is bent, the input device transmitting signals to the computer by depressing the elongated input button when the input device is coupled to the computer.

2. The input assembly of claim 1 wherein the second input device housing has a front portion and a back portion opposite the front portion, the elongated input button having a first end positioned toward the front portion and a second end positioned toward the back portion.

3. The input assembly of claim 1 wherein the input button has a first concave portion facing a first direction to engage the distal phalange of the finger and a second portion facing a second direction different than the first direction to engage the middle phalange of the finger.

4. The input assembly of claim 1 wherein at least a portion of the engaging surface of the input button is flush with the upper surface of the second input device housing.

5. The input assembly of claim 1 wherein the input button is elongated along an axis and has a curved cross-sectional shape when intersected by a plane perpendicular to the axis.

6. The input assembly of claim 1 wherein the input button is elongated along an axis and the engaging surface of the input button has a first elongated concave portion toward one edge thereof aligned with the axis and a second elongated concave portion toward an opposite edge aligned with the axis and facing the first elongated concave portion.

7. The input assembly of claim 1 wherein the input button is elongated along an axis between a first end and a second end and the engaging surface of the input button has a concave portion toward the first end generally perpendicular to the axis and shaped to engage an end of the distal phalange.

8. The input assembly of claim 1 wherein the input button is elongated along an axis and is canted about the axis relative to the upper surface of the second input device housing.

9. The input assembly of claim 1 wherein the input button is movable relative to the second input device housing along a motion path between a first position and a second position such that an angle between the motion path and the upper surface of the second input device housing is acute.

10. The input assembly of claim 1 wherein the input button is movable relative to the second input device housing along a motion path between a first position and a second position, the motion path being approximately normal to the upper surface of the second input device housing.

11. The input assembly of claim 1 wherein the input button is movable relative to the second input device housing along a motion path between a first position and a second position, the motion path being approximately parallel to the lower surface of the second input device housing.

12. The input assembly of claim 1 wherein the upper surface has an elongated aperture therein and the input button is accessible through the aperture in the upper surface.

13. The input assembly of claim 1 wherein the input button is a first input button, further comprising a second input button positioned adjacent the first input button, the second input button being proximate the second input device housing and movable relative to the second input device housing and having an elongated engaging surface to receive distal and middle phalanges of another human finger, the second input device housing having a second aperture with the engaging surface of the second input button accessible through the second aperture.

14. The input assembly of claim 1 wherein the other of the two second input devices includes:
a second input device housing having an outer surface with a lower portion configured to engage a support surface; and
another input button positioned proximate to the second input device housing outer surface and movable relative to the second input device housing outer surface, the other input button having an engaging surface concave relative to the second input device housing outer surface in a first plane to engage a lower surface and a side surface of a human finger, the engaging surface being convex in a second plane transverse to the first plane to engage the human finger when the human finger is bent, the other input button being movable relative to the second input device housing between a first position and a second position along an axis at least approximately parallel to the lower portion of the second input device housing.

15. The input assembly of claim 14 wherein the other input button is elongated along an axis and has a curved cross-sectional shape when intersected by a plane perpendicular to the axis.

16. The input assembly of claim 14 wherein the other input button is elongated along an axis and the engaging surface of the input button has a first elongated concave portion toward one edge thereof aligned with the axis and a second elongated concave portion toward an opposite edge aligned with the axis and facing the first elongated concave portion.

17. The input assembly of claim 14 wherein the other input button is elongated along an axis between a first end and a second end and the engaging surface of the input button has a concave portion toward the first end generally perpendicular to the axis and shaped to engage a distal phalange of the finger.

18. The input assembly of claim 14 wherein the other input button is elongated along an axis and is canted about the axis relative to the upper surface of the housing.

19. The input assembly of claim 14 wherein the second input device housing has an upper surface, a lower surface opposite the upper surface, and a back surface between the upper and lower surfaces, the input button being proximate the upper surface and back surface of the housing.

20. The input assembly of claim 14 wherein the other input button is a first other input button, further comprising a second other input button positioned proximate to the second input device housing outer surface and movable relative thereto, the second other input button having an engaging surface concave relative to the second input device housing outer surface to engage a lower surface and a side surface of another human finger.

21. The input assembly of claim 1 wherein the first input device housing has a first opening sized and shaped to removably receive the one second input device and a second opening sized and shaped to removably receive the other second input device.

22. The input assembly of claim 21 wherein the first input device housing has a curved outer surface and the one second input device has a corresponding curved outer surface that is flush with the outer surface of the first input device when the one second input device is in the first opening.

23. The input assembly of claim 21 wherein the first input device housing has a top surface and a bottom surface opposite the top surface, the first opening being positioned in the top surface of the housing.

24. The input assembly of claim 23 wherein the first opening extends through the housing from the top surface to the bottom surface.

25. The input assembly of claim 23 wherein the first opening has an open end in the upper surface and a closed end opposite the open end.

26. The input assembly of claim 25 wherein the closed end has a generally flat end surface facing the open end and the one second input device has an upper surface and a flat lower surface opposite the upper surface, the flat lower surface of the one second input device being proximate to the flat end surface of the closed end of the first opening when the one second input device is in the attached position.

27. The input assembly of claim 1 wherein the first input button and the first pointing device are proximate to an upper surface of the one second input device, the one second input device having a generally flat lower surface opposite the upper surface thereof to engage a generally flat working surface when the one second input device is in the detached position.

28. The input assembly of claim 1 wherein the one second input device has a housing and the pointing device comprises a sphere, a portion of which projects from the housing, the sphere being rotatable relative to the housing to receive commands from the user.

29. The input assembly of claim 1 wherein the pointing device comprises a touch-sensitive surface.

30. The input assembly of claim 1 wherein the one second input device has a housing and the pointing device comprises a joystick projecting from the housing.

31. The input assembly of claim 1 wherein the first end of the first input device is a right end and the second end is a left end, the one second input device being accessible to a user's right hand when in its attached position, the other second input device being accessible to the user's left hand when in its attached position.

32. The input assembly of claim 1 wherein the signal transmitter comprises a radio signal transmitter and the signal receiver comprises a radio signal receiver.

33. The input assembly of claim 1 wherein the signal transmitter comprises an infrared signal transmitter and the signal receiver comprises an infrared signal receiver.

34. The input assembly of claim 1 wherein the one second input device has a first portion facing a first direction to engage a distal phalange of a human finger and a second portion facing a second direction different than the first direction to engage at least one of a middle phalange and a proximal phalange of the finger.

35. The input assembly of claim 1 wherein the first input button is elongated.

36. The input assembly of claim 1 wherein the one second input device has a housing with an aperture therein and the first input button is accessible through the aperture, the first input button having an engaging surface that is concave relative to the housing to engage lower and side surfaces of a human finger.

37. The input assembly of claim 1 wherein one of the first and the one second input device has a first engagement member and the other of the first and the one second input device has a second engagement member, the first engagement member being biased toward and engaging the second engagement member when the one second input device is in its attached position to restrict motion of the one second input device away from the attached position.

38. An input assembly for a computer having a display, comprising:
- a first input device having a housing, a first end, a second end opposite the first end, and a plurality of input keys between the first and second ends, the first input device further having a top surface and a bottom surface opposite the top surface, the top surface having a curved outer edge and first and second openings extending through the outer edge from the top surface to the bottom surface, sidewalls of the first and second openings bring canted inwardly, and
- at least two second input devices;
- wherein one second input device is removably attached to the first input device toward the first end thereof and movable relative to the first input device between an attached position in which the one second input device is positioned within the first opening and a detached position in which the one second input device is spaced apart from the first opening, the one second input device having a curved outer edge approximately flush with the outer edge of the first input device housing when the one second input device is in the attached position, the one second input device further having a first input button and a first pointing device operatively coupled to the computer with a first communication link to transmit a first signal to the computer, the one second input device still further having a lower surface that is approximately flush with the bottom surface of the first input device and a tapered side surface approximately parallel to the sidewall of the first opening when the one second input device is positioned within the first opening in its attached position; and
- further wherein the other second input device is removably attached to the first input device separately from the one second input device toward the second end of the first input device and is movable relative to the first input device between an attached position in which the other second input device is positioned within the second opening and a detached position in which the other second input device is spaced apart from the second opening, the other second input device having a curved outer edge approximately flush with the outer edge of the first input device housing when the other second input device is in the attached position, the other second input device further having a second input button and a second pointing device operatively coupled to the computer with a second communication link to transmit a first signal to the computer, the other second input device still further having a lower surface that is approximately flush with the bottom surface of the first input device and a tapered side surface approximately parallel to the sidewall of the second opening when the other second input device is positioned within the second opening in its attached position; and
- wherein the one second input device has a second input device housing that includes the lower surface and an upper surface opposite the lower surface, further wherein the first input button includes an elongated input button proximate to the second input device housing and movable relative to the second input device housing, the first input button having an elongated engaging surface to receive distal and middle phalanges of a human finger, the engaging surface being concave in a first plane relative to the upper surface of the second input device housing to engage lower and side surfaces of the finger, the engaging surface being convex in a second plane transverse to the first plane to engage the finger when the finger is bent, the one second input device transmitting signals to the computer by depressing the elongated input button when the one second input device is coupled to the computer.

39. The input assembly of claim 38 wherein the first input device housing includes a forward portion and a rear portion opposite the forward portion, the first opening extending through the rear portion of the first input device housing.

40. The input assembly of claim 38 wherein the first pointing device includes a sphere, a portion of which projects from the housing of the one second input device, the sphere being rotatable relative to the housing to receive commands from the user.

41. The input assembly of claim 38 wherein the communication link includes a cable.

42. The input assembly of claim 38 wherein the first input button and the first pointing device are proximate to an upper surface of the one second input device, the one second input device having a generally flat lower surface opposite the upper surface thereof to engage a generally flat working surface when the one second input device is in the detached position.

43. The input assembly of claim 38 wherein the one second input device has a housing and the first pointing device comprises a sphere, a portion of which projects from the housing, the sphere being rotatable relative to the housing of the one second input device to receive commands from the user.

44. The input assembly of claim 38 wherein the first pointing device comprises a touch-sensitive surface.

45. The input assembly of claim 38 wherein the one second input device has a housing and the first pointing device comprises a joystick projecting from the housing of the one second input device.

46. The input assembly of claim 38 wherein the first end of the first input device is a right end and the second end is a left end, the one second input device being accessible to a user's right hand when in its attached position, the other second input device being accessible to the user's left hand when in its attached position.

47. The input assembly of claim 38 wherein the first communication link includes a radio signal transmitter and a radio signal receiver.

48. The input assembly of claim 38 wherein the first communication link includes an infrared signal transmitter and an infrared signal receiver.

49. The input assembly of claim 38 wherein the one second input device has a first portion facing a first direction to engage a distal phalange of a human finger and a second portion facing a second direction different than the first direction to engage at least one of a middle phalange and a proximal phalange of the finger.

50. The input assembly of claim 38 wherein the first input button is elongated.

51. The input assembly of claim 38 wherein the one second input device has a housing with an aperture therein and the first input button is accessible through the aperture, the first input button having an engaging surface that is concave relative to the housing to engage lower and side surfaces of a human finger.

52. The input assembly of claim 38 wherein one of the first input device and the one second input device has a first engagement member and the other of the first input device and the one second input device has a second engagement member, the first engagement member being biased toward and engaging the second engagement member when the one second input device is in its attached position to restrict motion of the one second input device away from the attached position.

53. The assembly of claim 38 wherein the second input device housing has a front portion and a back portion opposite the front portion, the elongated input button having a first end positioned toward the front portion and a second end positioned toward the back portion.

54. The assembly of claim 38 wherein the first input bottom has a first concave portion facing a first direction to engage the distal phalange of the finger and a second portion facing a second direction different than the first direction to engage the middle phalange of the finger.

55. The assembly of claim 38 wherein at least a portion of the engaging surface of the input button is flush with the upper surface of the second input device housing.

56. The assembly of claim 38 wherein the first input button is elongated along an axis and has a curved cross-sectional shape when intersected by a plane perpendicular to the axis.

57. The assembly of claim 38 wherein the first input button is elongated along an axis and the engaging surface of the first input button has a first elongated concave portion toward one edge thereof aligned with the axis and a second elongated concave portion toward an opposite edge aligned with the axis and facing the first elongated concave portion.

58. The assembly of claim 38 wherein the first input button is elongated along an axis between a first end and a second end and the engaging surface of the first input button has a concave portion toward the first end generally perpendicular to the axis and shaped to engage an end of the distal phalange.

59. The assembly of claim 38 wherein the first input button is elongated along an axis and is canted about the axis relative to the upper surface of the second input device housing.

60. The assembly of claim 38 wherein the first input button is movable relative to the second input device housing along a motion path between a first position and a second position such that an angle between the motion path and the upper surface of the second input device housing is acute.

61. The assembly of claim 38 wherein the first input button is movable relative to the second input device housing along a motion path between a first position and a second position, the motion path being approximately normal to the upper surface of the second input device housing.

62. The assembly of claim 38 wherein the input button is movable relative to the second input device housing along a motion path between a first position and a second position, the motion path being approximately parallel to the lower surface of the second input device housing.

63. The assembly of claim 38 wherein the upper surface of the second input device housing has an elongated aperture therein and the first input button is accessible through the aperture in the upper surface.

64. The assembly of claim 38 wherein the first communication link includes a cable extending between the second input device housing and the computer.

65. The assembly of claim 38 wherein the first communication link includes a wireless signal transmitter in one of the housing and the computer and a wireless signal receiver in the other of the second input device housing and the computer.

66. The assembly of claim 38 wherein the signal transmitter includes a radio signal transmitter and the signal receiver comprises a radio signal receiver.

* * * * *